US012601945B2

(12) United States Patent
Chen et al.

(10) Patent No.: US 12,601,945 B2
(45) Date of Patent: Apr. 14, 2026

(54) FRAME STRUCTURE, BACKLIGHT MODULE AND DISPLAY DEVICE

(71) Applicant: Radiant Opto-Electronics Corporation, Kaohsiung (TW)

(72) Inventors: Pei-Jan Chen, Kaohsiung (TW); Chung-Cheng Chang, Kaohsiung (TW); Pei-Fen Hou, Kaohsiung (TW)

(73) Assignee: Radiant Opto-Electronics Corporation, Kaohsiung (TW)

( * ) Notice: Subject to any disclaimer, the term of this patent is extended or adjusted under 35 U.S.C. 154(b) by 0 days.

(21) Appl. No.: 19/022,490

(22) Filed: Jan. 15, 2025

(65) Prior Publication Data

US 2025/0155747 A1 May 15, 2025

Related U.S. Application Data

(63) Continuation of application No. PCT/CN2023/109385, filed on Jul. 26, 2023.

(51) Int. Cl.
*G02F 1/13357* (2006.01)

(52) U.S. Cl.
CPC .. *G02F 1/133608* (2013.01); *G02F 1/133605* (2013.01)

(58) Field of Classification Search
CPC ............. G02F 1/133608; G02F 1/1333; G02F 1/133603; G02F 1/133605; F21V 7/0083
See application file for complete search history.

(56) References Cited

U.S. PATENT DOCUMENTS

| | | | | |
|---|---|---|---|---|
| 7,826,206 B2 * | 11/2010 | Woo | | G02F 1/133308 |
| | | | | 361/679.05 |
| 12,174,487 B1 * | 12/2024 | Yasunaga | ......... | G02F 1/133603 |
| 2017/0168345 A1 * | 6/2017 | Wu | | G02F 1/133308 |
| 2020/0218112 A1 * | 7/2020 | Chae | | G02F 1/133611 |
| 2023/0099119 A1 | 3/2023 | Chang et al. | | |

FOREIGN PATENT DOCUMENTS

| | | | | |
|---|---|---|---|---|
| CN | 1892320 A | 1/2007 | | |
| CN | 203365850 U | 12/2013 | | |
| CN | 204479876 U | 7/2015 | | |
| CN | 106125405 A | * 11/2016 | ....... | G02F 1/133608 |
| CN | 214335422 U | * 10/2021 | | |
| CN | 217879902 U | 11/2022 | | |

(Continued)

*Primary Examiner* — Erin Kryukova

(57) ABSTRACT

A frame structure includes an inner frame and a plurality of outer frames combined with the inner frame. The inner frame has at least one first joint member disposed on its outer surface, and the first joint member extends at least along a first direction. The outer frames are detachably combined with the inner frame along the first direction, so that the inner frame is surrounded by the outer frames. Each of the outer frames has at least one second joint member disposed on its inner surface. Each of the outer frames is combined with the inner frame through the cooperation between the second joint member and the first joint member of the inner frame in the first direction. Assembling the inner frame directly with the outer frames can reduce the number of assembly parts and improve the convenience of assembly and rework. The invention also provides a backlight module and a display device including the frame structure.

18 Claims, 8 Drawing Sheets

(56) References Cited

FOREIGN PATENT DOCUMENTS

| | | | | | |
|---|---|---|---|---|---|
| CN | 217954873 | U | 12/2022 | | |
| JP | 2007207506 | A | 8/2007 | | |
| JP | 5493825 | B2 * | 5/2014 | ....... | G02F 1/133308 |
| KR | 20040026425 | A * | 3/2004 | ....... | G02F 1/133308 |
| KR | 100522444 | B1 | 10/2005 | | |
| KR | 1020150074497 | A | 7/2015 | | |
| TW | M641295 | U | 5/2023 | | |
| WO | 2022116658 | A1 | 6/2022 | | |

* cited by examiner

FIG. 1

FRAME STRUCTURE, BACKLIGHT MODULE AND DISPLAY DEVICE

RELATED APPLICATIONS

This application is a continuation application of International Application No. PCT/CN2023/109385, filed on Jul. 26, 2023, which claims priority to China Application Serial Number 202310736560.2, filed on Jun. 20, 2023. The entire disclosures of all the above applications are hereby incorporated by reference.

FIELD OF THE INVENTION

The present invention relates to an optical equipment, particularly a frame structure, and a backlight module and a display device that include the frame structure.

BACKGROUND OF THE INVENTION

Conventional display devices typically comprise a display panel and a backlight module. The backlight module connecting to the display panel through its frame components. The backlight module is assembled by combining a frame component, a light source, and a plurality of optical sheets. Since the components of the current backlight module are still too complex, burrs, residues or foreign matter on each component will also affect the assembly efficiency, thereby increasing the assembly cost.

Therefore, how to reduce the number of components to reduce burrs, residues and foreign matter, reduce rework costs caused by poor assembly, and at the same time improve the assembly efficiency and product yield of backlight modules has become a very important issue.

SUMMARY OF THE INVENTION

One object of the present invention is to provide a frame structure that reduces the number of components.

The frame structure comprises an inner frame and a plurality of outer frames. The inner frame includes at least one first joint member disposed on its outer surface, wherein the first joint member extends along at least a first direction on the outer surface. The outer frames surround the inner frame and are detachably coupled to the inner frame along the first direction. Each of the outer frames has at least one second joint member disposed on its inner surface, and the at least one second joint member of each said outer frame cooperates with the first joint member of the inner frame in the first direction to combine the outer frame with the inner frame.

In a preferable embodiment, each of the outer frames includes a side wall and a bottom wall connected to the side wall, the second joint member is provided on the inner surface of the side wall, the side wall and the bottom wall jointly surround an accommodation space, and the inner frame is accommodated in the accommodation space.

In a preferable embodiment, the inner frame further includes a plurality of fixed columns, the fixed columns extend toward the bottom wall of the outer frame.

In a preferable embodiment, the inner frame further includes a plurality of nuts respectively embedded in corresponding fixed columns, the bottom wall of each said outer frame has a plurality of perforations, and the perforations respectively correspond to the fixed columns of the inner frame, and the frame structure further comprises a plurality of engaging parts that pass through the perforations and are correspondingly fastened to the nuts.

In a preferable embodiment, the first joint member of the inner frame is in the shape of a groove, and the second joint member of each said outer frame is in the shape of a convex strip.

In a preferable embodiment, the first joint member of the inner frame is provided around the outer surface to extend along the first direction and a second direction at the same time, the second direction is not parallel to the first direction, the number of second joint member of each said outer frame is plural and divided into a first group extending along the first direction, and a second group extending along the second direction, the second joint member belonging to the first group can cooperate and slide within the first joint member of the inner frame in the first direction, until the second joint member belonging to the second group is positioned in the first joint member of the inner frame in the second direction.

In a preferable embodiment, the inner frame further includes a plurality of reflective portions arranged in a matrix, and a surrounding portion surrounding the reflective portion, and the first joint member is disposed on the outer surface of the surrounding portion.

Another object of the present invention is to provide a backlight module which comprises the frame structure as described above, and a light source. The light source includes a board and a plurality of light-emitting elements arranged in a matrix on the board, each said reflective portion of the inner frame has an opening, the inner frame is disposed on the board so that the light-emitting elements pass through corresponding openings and extend into corresponding reflective portions.

In a preferable embodiment, the backlight module further includes an optical unit disposed on the inner frame, the inner frame further includes at least one positioning member disposed on the surrounding portion, and the positioning member surrounds the optical unit.

In a preferable embodiment, the backlight module further includes an optical unit, the optical unit has a plurality of optical films, and the surrounding portion of the inner frame has a plurality of stepped platforms of different heights for adhering and fixing each of the optical films of the optical unit.

Another object of the present invention is to provide a display device which comprises the backlight module as described above, and a display panel arranged on the backlight module. Each of the outer frames further includes a top wall and at least one limiting member, the top wall is located above the surrounding portion of the inner frame, and the limiting member is disposed on the top wall and surrounds the periphery of the display panel.

Another object of the present invention is to provide a backlight module. The backlight module comprises a light source, a reflective unit, and a plurality of outer frames. The light source includes a board and a plurality of light-emitting elements arranged in a matrix on the board. The reflective unit includes a plurality of reflective portions arranged in a matrix, a surrounding portion surrounding the reflective portions, and at least one first joint member provided on the surrounding portion. The first joint member extends along at least a first direction on the outer surface of the surrounding portion, wherein, each of the reflective portions has an opening, and the reflection unit is arranged on the board so that the light-emitting elements pass through the corresponding openings and extend into the corresponding reflecting portions. The outer frames surround the reflective unit and are detachably coupled to the reflective unit along the first direction. Each of the outer frames has at least one second joint member disposed on its inner surface, and the at least one second joint member of each said outer frame cooperates with the first joint member of the reflective unit in the first direction to combine the outer frame with the reflective unit.

In a preferable embodiment, the backlight module further includes an optical unit, the optical unit has a plurality of optical films, and the surrounding portion of the reflective unit has a plurality of stepped platforms of different heights for adhering and fixing each of the optical films of the optical unit.

In a preferable embodiment, the backlight module further includes an optical unit disposed on the reflective unit, the reflective unit further includes at least one positioning member disposed on the surrounding portion, and the positioning member surrounds the optical unit.

In a preferable embodiment, the reflective unit further includes a plurality of fixed columns extending toward the outer frame, and the extension direction of the fixed columns is not parallel to the first direction.

In a preferable embodiment, the reflection unit further includes a plurality of ribs respectively provided on the outer surface of the corresponding fixed columns and arranged at radial intervals, and the ribs extend along the axial direction of the fixed columns and press against the board.

In a preferable embodiment, the board of the light source has a plurality of openings, and the fixed columns of the reflective unit are respectively aligned with the openings of the board.

In a preferable embodiment, each said outer frame includes a bottom wall, the bottom wall has a plurality of perforations, the perforations are respectively corresponding to the fixed columns of the reflective unit, and each of the fixed columns of the reflective unit extends into the opening of the board and does not extend into the perforation of the bottom wall.

Another object of the present invention is to provide a display device which comprises the backlight module as described above, and a display panel arranged on the backlight module. Each of the outer frames further includes a top wall and at least one limiting member, the top wall is located above the surrounding portion of the reflective unit, and the limiting member is disposed on the top wall and surrounds the periphery of the display panel.

The characteristic of the present invention is that a plurality of outer frames are detachably combined with the inner frame along the first direction, and the inner frame is surrounded by the outer frame. As each said outer frame is coupled to the inner frame by using the second joint member and the first joint member of the inner frame to cooperate with each other in the first direction, thereby improving assembly accuracy. In addition, there is no need to use the upper frame in conventional technology, so the number of assembly parts can be reduced, and the convenience of assembly and rework is also improved. Additionally, it can avoid burrs or residues and reduce the risk of scratching the films and the entry of foreign matter during assembly.

BRIEF DESCRIPTION OF THE DRAWINGS

FIG. 1 is a three-dimensional exploded diagram according to a preferred embodiment of a backlight module of this invention.

DETAILED DESCRIPTION OF THE INVENTION

The detailed description and preferred embodiments of the invention will be set forth in the following content and provided for people skilled in the art to understand the characteristics of the invention. In addition, the directional terms mentioned in the following embodiments, such as up, down, left, right, front, back, bottom, top, etc., are only for reference to the directions in the attached drawings. Therefore, the directional terms used are illustrative rather than limiting.

Figure 1:
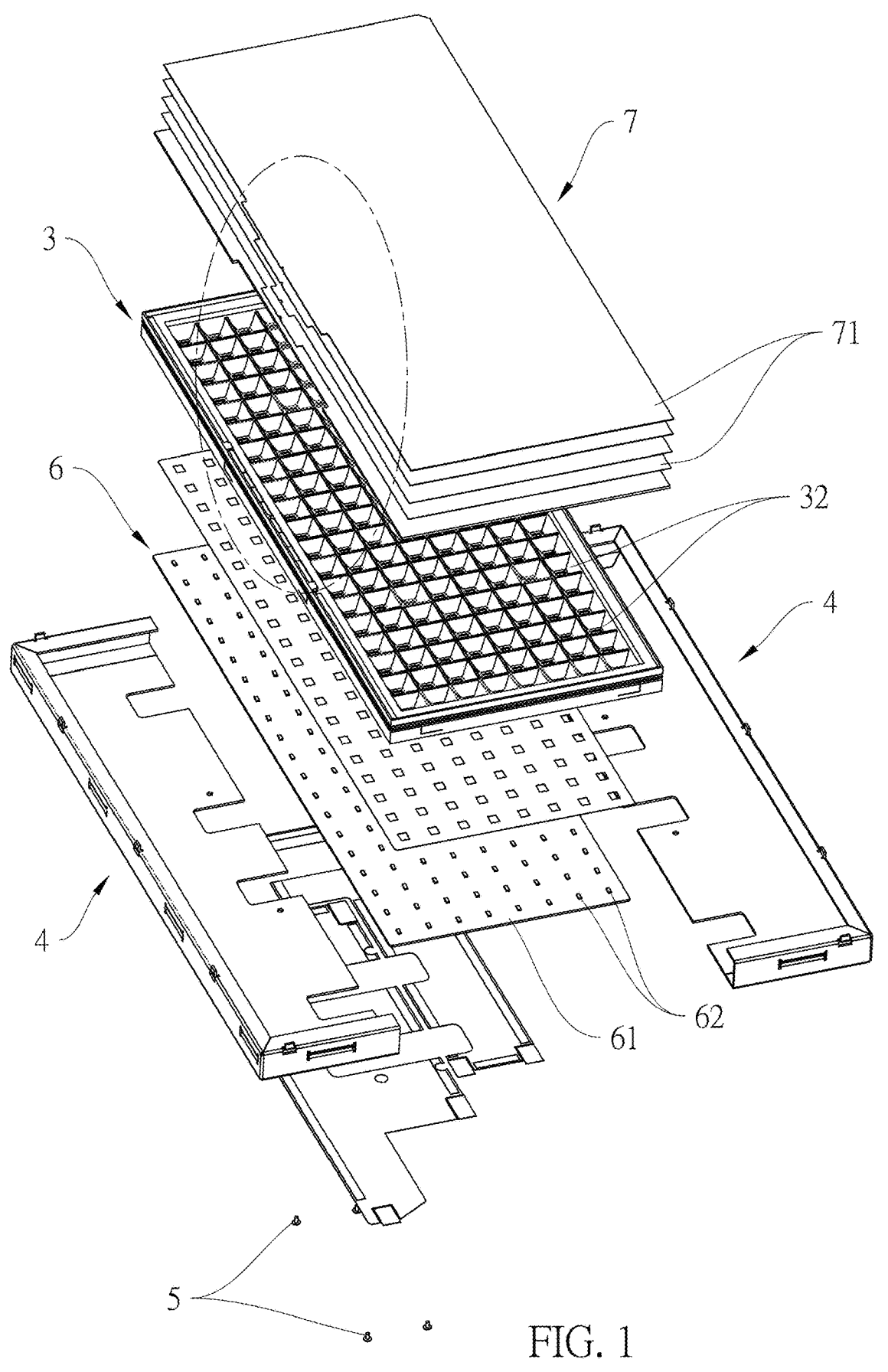
Figure 2:
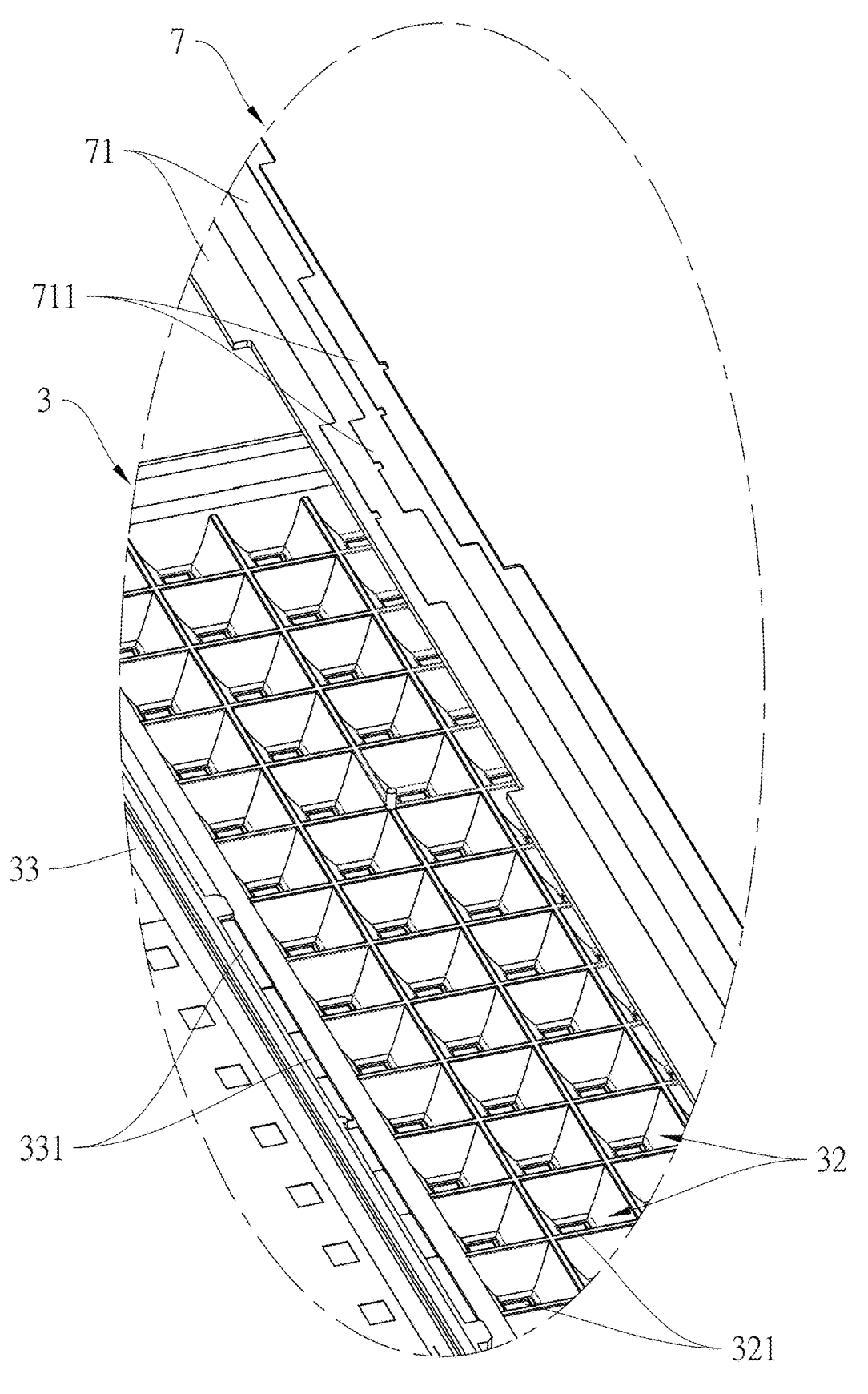
FIG. 2 is a three-dimensional diagram depicting an enlarged view of the indicated area A in FIG. 1.
Figure 3:
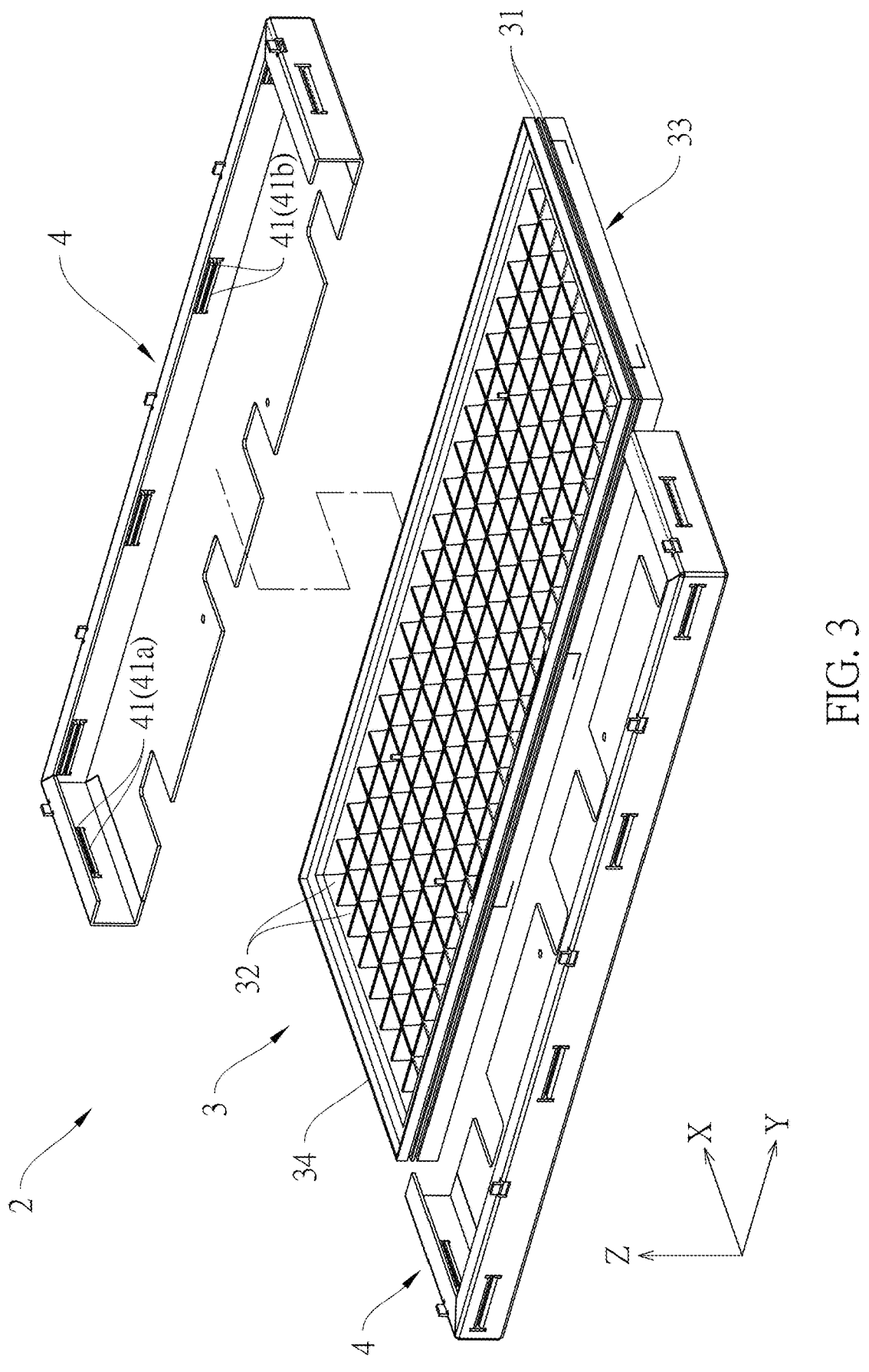
FIG. 3 is a three-dimensional exploded diagram depicting an enlarged view of an inner frame and two outer frames.
Figure 4:
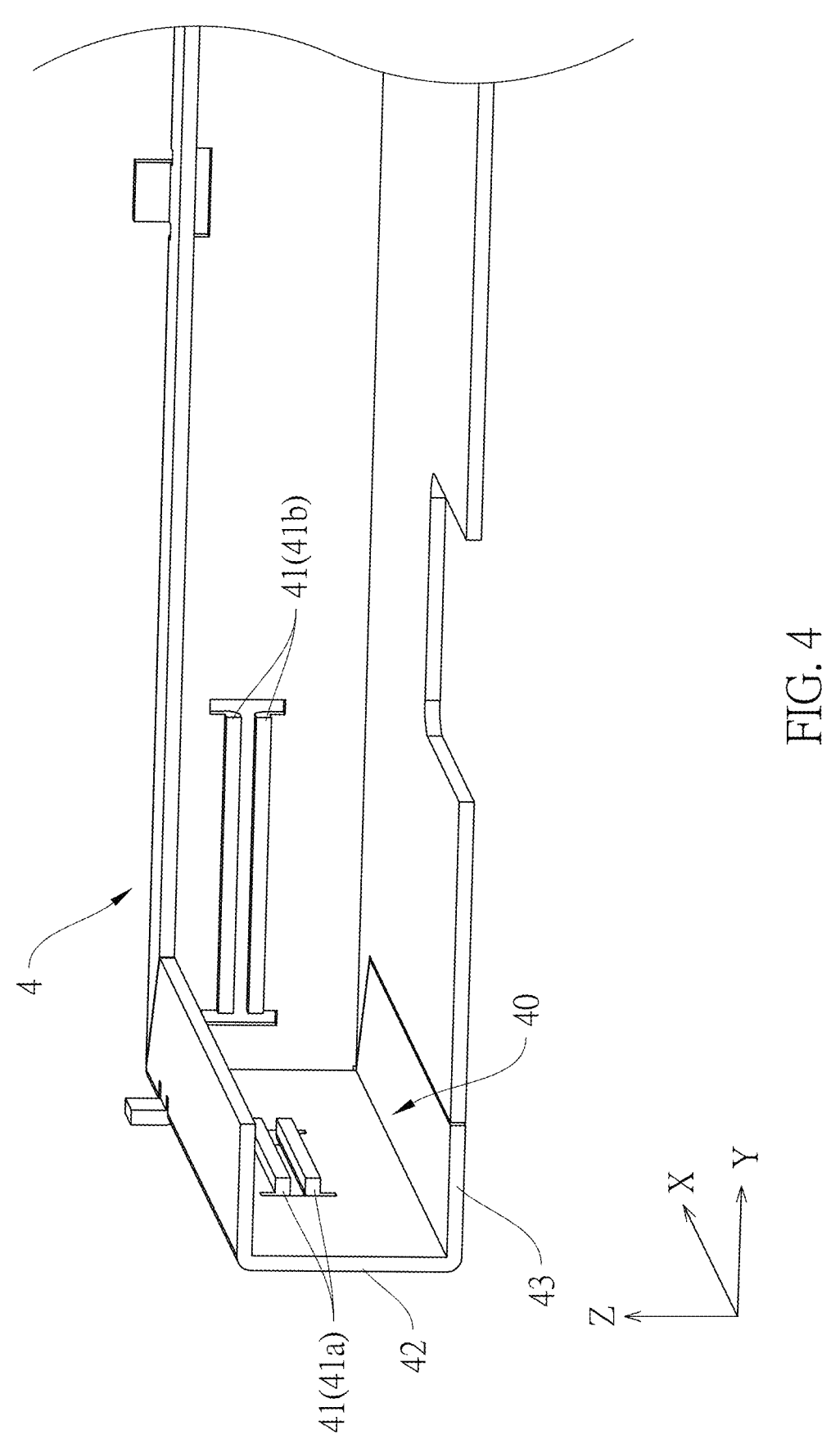
FIG. 4 is a three-dimensional diagram depicting an enlarged view of the outer frame.

Referring to FIG. 1 to FIG. 3, it is a preferred embodiment of the backlight module of the present invention. The backlight module comprises a frame structure 2, a light source 6, and an optical unit 7. The frame structure 2 includes an inner frame 3 and a plurality of outer frames 4 combined with the inner frame 3. Referring to FIG. 3 and FIG. 4, the inner frame 3 has at least one first joint member 31 disposed on its outer surface, and the first joint member 31 extends along at least a first direction X on the outer surface. The outer frames 4 are detachably coupled to the inner frame 3 along the first direction X, so that the inner frame 3 is surrounded by the outer frames 4. Each said outer frame 4 has at least one second joint member 41 disposed on its inner surface, and the at least one second joint member 41 of each said outer frame 4 cooperates with the first joint member 31 of the inner frame 3 in the first direction X to combine the outer frames 4 with the inner frame 3. The frame structure 2 is designed to have a plurality of outer frames 4 detachably coupled to the inner frame 3 along the first direction X, and the inner frame 3 is surrounded by the outer frames 4. As each said outer frame 4 is coupled to the inner frame 3 by using the second joint member 41 to cooperate with the first joint member 31 of the inner frame 3 in the first direction X, thereby the assembly tolerance can be reduced. Furthermore, there is no need to use the upper frame as in the conventional technology, so the number of assembly parts can be reduced, and the convenience of assembly and rework is also improved. Additionally, it can avoid burrs or residues and reduce the risk of scratching the films and the entry of foreign matter during assembly.

Figure 5:
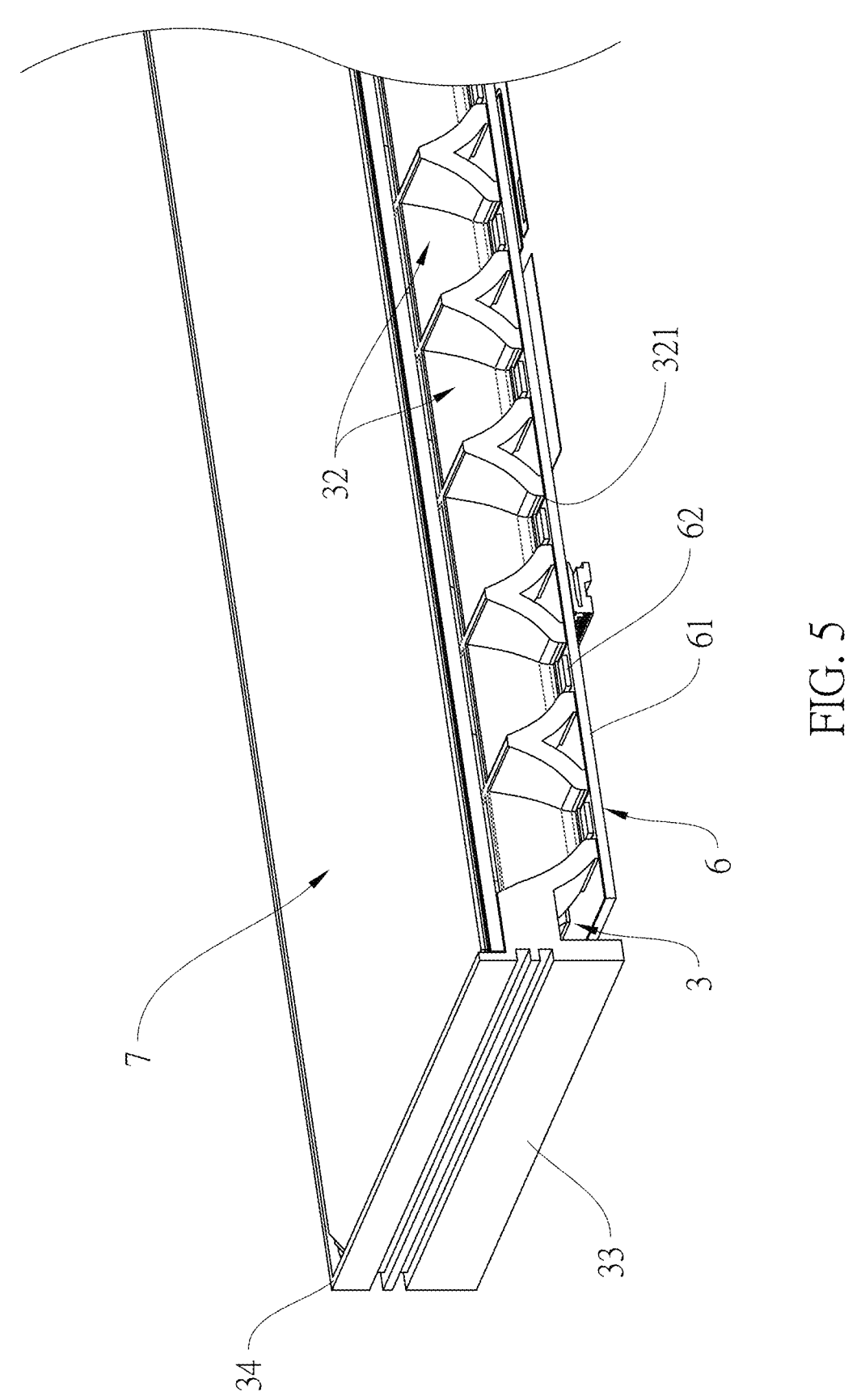
FIG. 5 is a partial cross-sectional diagram illustrating the combination of the inner frame with a light source and an optical unit.

Referring to FIG. 1 and FIG. 2, in this embodiment, the light source 6 includes a board 61 and a plurality of light-emitting elements 62 arranged in a matrix on the board 61. The structure of the inner frame 3 is like a reflective unit and includes a plurality of reflective portions 32 arranged in a matrix, and a surrounding portion 33 surrounding the reflective portions 32. Each said reflective portion 32 of the inner frame 3 has an opening 321. The inner frame 3 is disposed on the board 61 so that the light-emitting elements 62 pass through the corresponding openings 321 and extend into the corresponding reflecting portions 32 (as shown in FIG. 5). Therefore, the inner frame 3 is a three-dimensional reflector, or can be called a reflective unit. The optical unit 7 is disposed on the inner frame 3 and has a plurality of optical films 71. The surrounding portion 33 of the inner frame 3 has a plurality of stepped platforms 331 of different heights for adhering and fixing each of the optical films 71 of the optical unit 7. Different optical films 71 have protruding portions 711 of different sizes respectively adhered to the stepped platforms 331 of different heights. By utilizing the stepped platforms 331 of different heights and the protruding portions 711 of different sizes, the correct optical film 71 and its attachment position can be easily identified, thereby improving the accuracy and efficiency of the adhesive operation. Referring to FIG. 5, the inner frame 3 further includes a positioning member 34 provided on the surrounding portion 33. The positioning member 34 surrounds the periphery of the optical unit 7. When the optical unit 7 is supported on the surrounding portion 33 of the inner frame 3, the positioning member 34 can prevent the optical unit 7 from lateral displacement. This is to avoid vibrations during movement or reliability testing that may cause the optical film 7 to shift and affect the optical quality. After the inner frame 3, the light source 6, and the optical unit 7 are assembled, the outer frames 4 are combined with the inner frame 3.

Referring to FIG. 3 and FIG. 4, in more detail, the first joint member 31 of the inner frame 3 is arranged around the outer surface of the surrounding portion 33 and extending along the first direction X and a second direction Y simultaneously. The second direction Y is not parallel to the first direction X. The number of the outer frames 4 is two. Each said outer frame 4 includes a side wall 42 and a bottom wall 43 connected to the side wall 42. The second joint member 41 is provided on the inner surface of the side wall 42. The side wall 42 and the bottom wall 43 together surround an accommodating space 40, and the inner frame 3 is accommodated in the accommodating space 40. The first joint member 31 is in the shape of a groove, and the second joint member 41 of each said outer frame 4 is in the shape of a convex strip. The inner frame 3 and the outer frame 4 are assembled in such a way that the second joint member 41 slides laterally inside the first joint member 31.

The number of the second joint members 41 of each said outer frame 4 is plural and divided into a first group 41a extending along the first direction X and a second group 41b extending along the second direction Y. The second joint members 41 belonging to the first group 41a can cooperate and slide within the first joint members 31 of the inner frame 3 in the first direction X until the second joint members 41 belonging to the second group 41b are positioned in the first joint member 31 of the inner frame 3 in the second direction Y. That is, when each said outer frame 4 is to be combined with the inner frame 3, the second joint members 41 belonging to the first group 41a of the outer frame 4 are sliding along the first direction X (the short side of the inner frame 3) for assembly. Therefore, only in the first direction X, the chute engagement form is formed to cooperate with each other and slide. All directions other than the first direction X are used for position limiting. The outer frame 4 will continue to slide in the first direction X until the second joint member 41 belonging to the second group 41b is positioned inside the first joint member 31 of the inner frame 3 in the second direction Y (the long side of the inner frame 3). When the outer frames 4 are completely combined with the inner frame 3, the second joint members 41 of either the first group 41a or the second group 41b are positioned inside the first joint member 31 of the inner frame 3. In this way, in addition to having a positioning effect in both the first direction X and the second direction Y, a limiting effect can also be produced to prevent the outer frame 4 from moving relative to the inner frame 3 in a third direction Z. Additionally, this assembly method can also effectively reduce the difficulty of rework.

Figure 6:
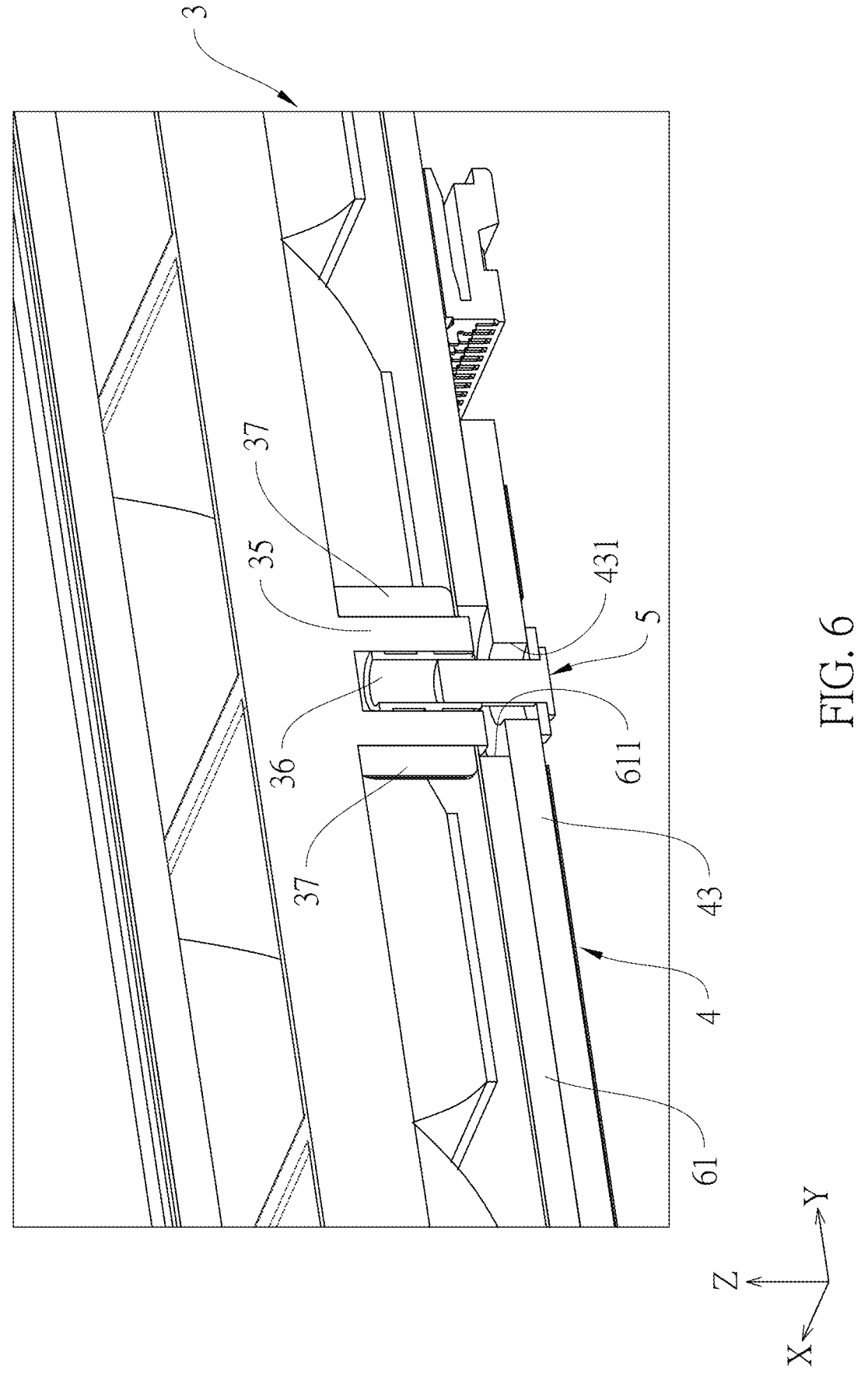
FIG. 6 is a partial cross-sectional diagram illustrating the engaging method of the inner frame and the outer frame.

Referring to FIG. 6, the inner frame 3 further includes a plurality of fixed columns 35 and a plurality of nuts 36 respectively embedded in the corresponding fixed columns 35. The fixed columns 35 extends along the third direction Z toward the bottom wall 43 of the outer frame 4. The bottom wall 43 of each said outer frame 4 has a plurality of perforations 431. The board 61 of the light source 6 has a plurality of openings 611. The perforations 431 respectively correspond to the openings 611 of the board 61 and the fixed columns 35 of the inner frame 3. The frame structure 2 further comprises a plurality of engaging parts 5 that pass through the perforations 431 and correspondingly fasten to the nuts 36. When the outer frames 4 are completely combined with the inner frame 3, the perforations 431 of the outer frames 4 will be aligned with the fixed columns 35 of the inner frame 3, allowing the engaging parts 5 to fasten accordingly to the nuts 36 in the fixed columns 35 to enhance the assembly stability of the outer frames 4 and the inner frame 3. If the outer frames 4 are not completely assembled on the inner frame 3, the perforations 431 cannot be aligned with the fixed columns 35, resulting in the engaging parts 5 being unable to fasten. Therefore, it can be used as a basis for judging whether the outer frames 4 are indeed assembled.

In addition, the fixed columns 35 of the inner frame 3 extend into the openings 611 of the board 61, but do not extend into the perforations 431 of the bottom wall 43 of the outer frame 4. That is, the fixed columns 35 do not protrude from the outer frame 4. Therefore, when the outer frames 4 move along the first direction X, they will not be interfered by the fixed columns 35. In this way, the fixed columns 35 can be used to align the openings 611 of the board 61 and provide an obvious positioning effect during engagement. The inner frame 3 further includes a plurality of ribs 37 that are respectively arranged on the outer surface of the corresponding fixed column 35 and arranged in a radial manner. The ribs 37 extend along the axial direction of the fixed column 35. After the engaging parts 5 are assembled, the ribs 37 located on the outer surface of the fixed columns 35 will press against the board 61, which can apply stress to the board 61 and prevent the board 61 from warping.

The size of the opening 611 of the board 61 can only accommodate the fixed column 35, the ribs 37 cannot pass through, and the protruding length of each said rib 37 is slightly smaller than the protruding length of the fixed column 35. Therefore, when the fixed column 35 extends into the opening 611 of the board 61, the rib 37 does not enter the opening 611 but contacts and presses against the board 61. This can provide a feeling of correct alignment during assembly for workers, besides, the fixed column 35 will not extend into the perforation 431 of the bottom wall 43 and prevent the fixed column 35 from hitting the bottom wall 431 and causing damage to the fixed column 35.

Figure 7:
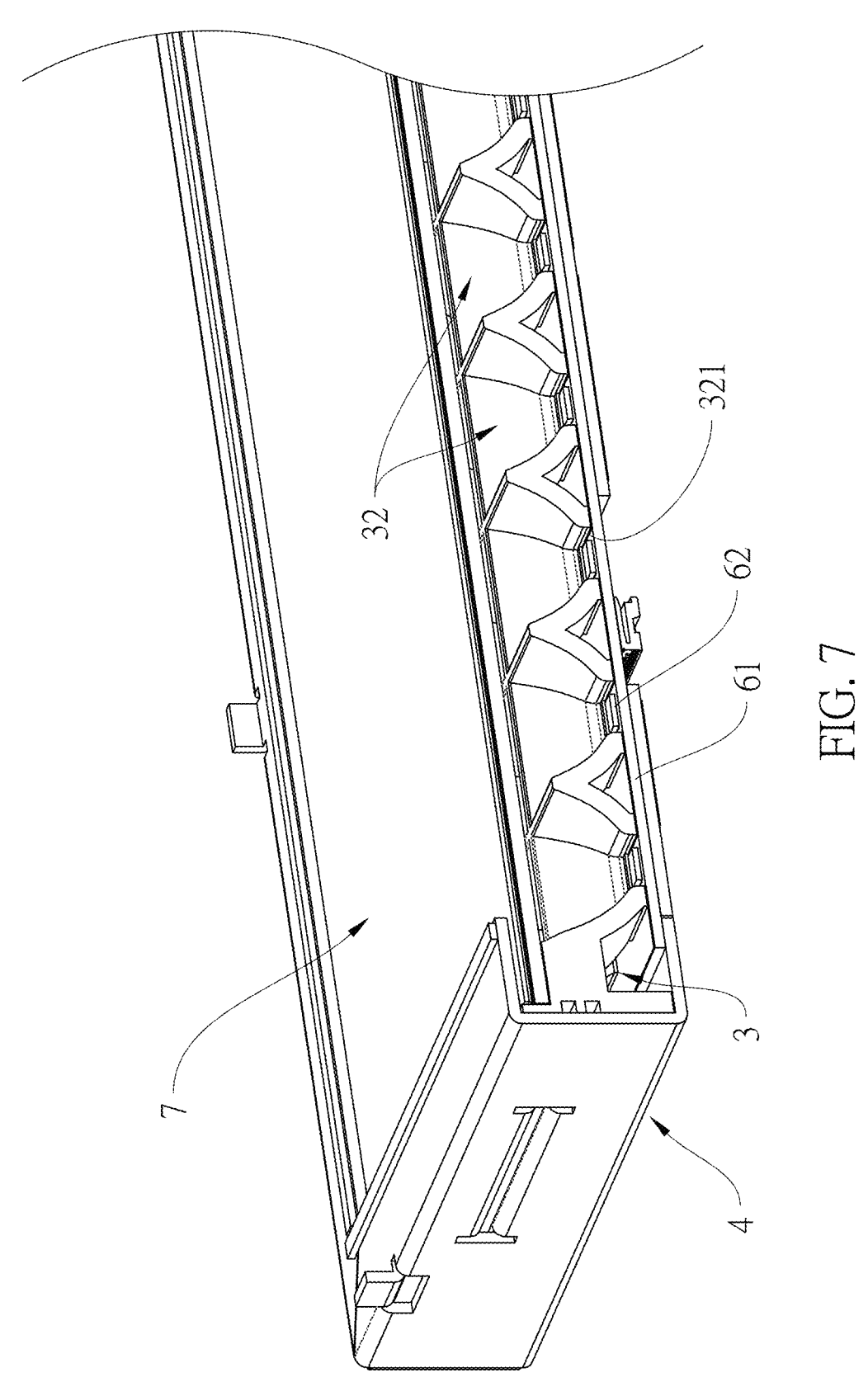
FIG. 7 is a partial cross-sectional diagram illustrating the structure of the inner frame combined with the outer frames.

Referring to FIG. 7, which shows the appearance of the outer frames 4 assembled on the inner frame 3.

Figure 8:
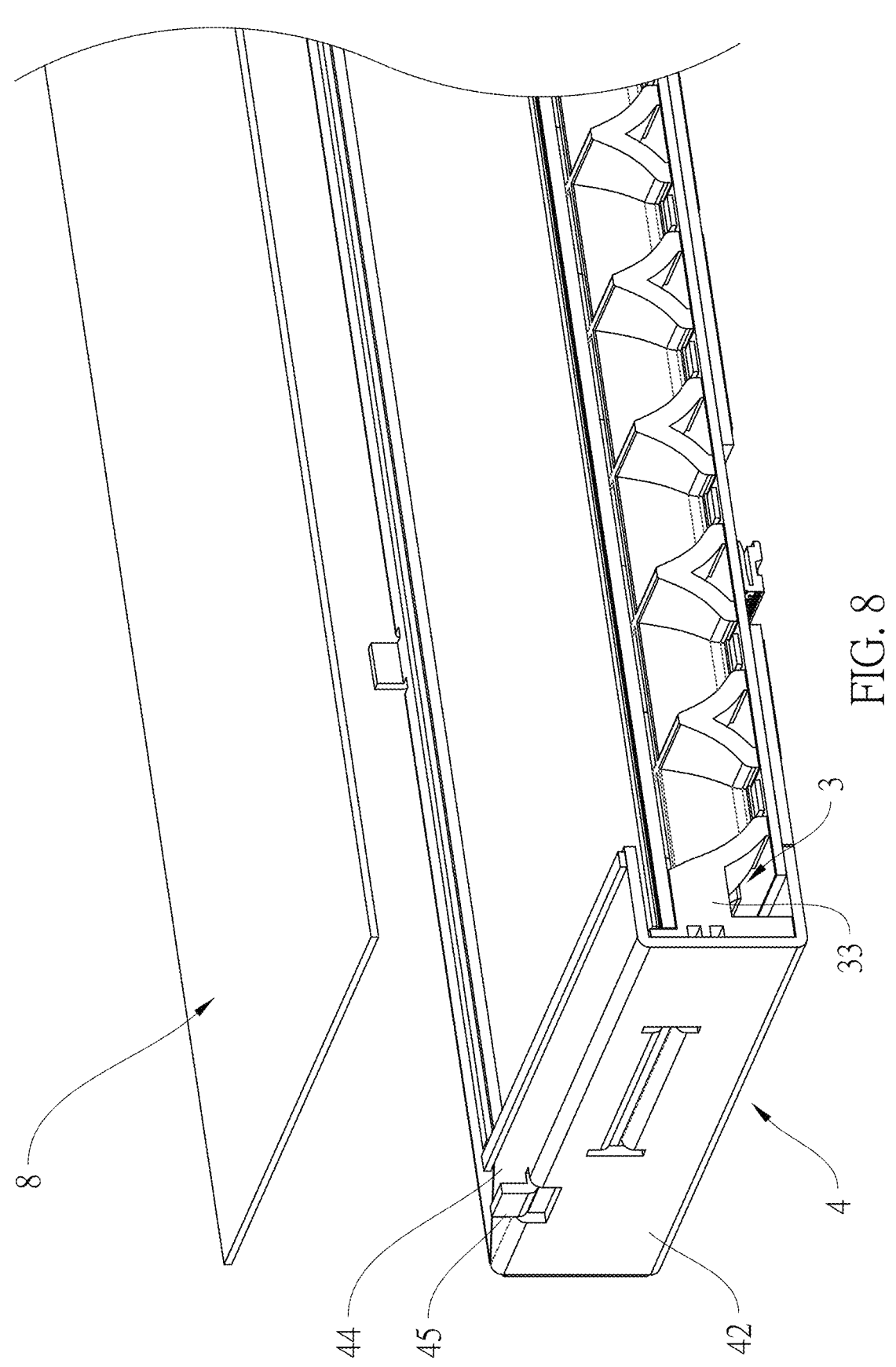
FIG. 8 is a three-dimensional diagram according to a preferred embodiment of a display device of this invention.

Referring to FIG. 8, a display device of the present invention is a display panel 8 provided on the backlight module. Each said outer frame 4 further includes a top wall 44 and at least one limiting member 45. The top wall 44 is located above the surrounding portion 33 of the inner frame 3. The display panel 8 is supported on the top wall 44, and the limiting member 45 is disposed on the top wall 44 and surrounds the periphery of the display panel 8 to limit the display panel 8.

The frame structure 2 uses the outer frames 4 to replace the upper frame and back frame in the prior art, reducing the number of assembly parts and costs. It can also reduce the assembly time of the upper frame, avoid burrs or residues and the risk of scratching the films and the entry of foreign matter when assembling the upper frame from top to bottom. The design of the inner frame 3 and the outer frames 4 being directly slid and assembled replaces the structure in the prior art that uses hooks to engage with each other, which improves assembly accuracy and can comply with the three-dimensional limiting and fixing structure. This design can improve the thinning and the stability of the reliability testing process of the backlight module, reduce the linkage effects derived from traditional multi-part material matching, reduce the number and cost of parts, and further reduce the impact of assembly fixtures and assembly related issues and can be widely used in LCD displays.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A frame structure, comprising:

an inner frame, including at least one first joint member disposed on its outer surface, wherein the first joint member extends along at least a first direction on the outer surface; and a plurality of outer frames, which surround the inner frame and are detachably coupled to the inner frame along the first direction, each of the outer frames has at least one second joint member disposed on its inner surface, and the at least one second joint member of each said outer frame cooperates with the at least one first joint member of the inner frame in the first direction to combine the outer frame with the inner frame;

wherein the at least one second joint member can cooperate and slide within the at least one first joint member of the inner frame in the first direction;

wherein the inner frame further includes a plurality of reflective portions arranged in a matrix, and a surrounding portion surrounding the reflective portion, and the at least one first joint member is disposed on the outer surface of the surrounding portion.

2. The frame structure as claimed in claim 1, wherein each of the outer frames includes a side wall and a bottom wall connected to the side wall, the second joint member is provided on the inner surface of the side wall, the side wall and the bottom wall jointly surround an accommodation space, and the inner frame is accommodated in the accommodation space.

3. The frame structure as claimed in claim 2, wherein the inner frame further includes a plurality of fixed columns, the fixed columns extend toward the bottom walls of each of the outer frames.

4. The frame structure as claimed in claim 3, wherein the inner frame further includes a plurality of nuts respectively embedded in corresponding fixed columns, the bottom wall of each said outer frame has a plurality of perforations, and the perforations respectively correspond to the fixed columns of the inner frame, and the frame structure further comprises a plurality of engaging parts that pass through the perforations and are correspondingly fastened to the nuts.

5. The frame structure as claimed in claim 1, wherein the at least one first joint member of the inner frame is in the shape of a groove, and the second joint member of each said outer frame is in the shape of a convex strip.

6. The frame structure as claimed in claim 1, wherein the at least one first joint member of the inner frame is provided around the outer surface to extend along the first direction and a second direction at the same time, the second direction is not parallel to the first direction, the number of second joint members of each said outer frame is plural and divided into a first group extending along the first direction, and a second group extending along the second direction, each of the second joint members belonging to the first group can cooperate and slide within the first joint member of the inner frame in the first direction, until each of the second joint members belonging to the second group is positioned in the at least one first joint member of the inner frame in the second direction.

7. A backlight module, comprising the frame structure as claimed in claim 1 and a light source, the light source includes a board and a plurality of light-emitting elements arranged in a matrix on the board, each said reflective portion of the inner frame has an opening, the inner frame is disposed on the board so that the light-emitting elements pass through corresponding openings and extend into corresponding reflective portions.

8. The backlight module as claimed in claim 7, wherein the backlight module further includes an optical unit disposed on the inner frame, the inner frame further includes at least one positioning member disposed on the surrounding portion, and the positioning member surrounds the optical unit.

9. The backlight module as claimed in claim 7, wherein the backlight module further includes an optical unit, the optical unit has a plurality of optical films, and the surrounding portion of the inner frame has a plurality of stepped platforms of different heights for adhering and fixing each of the optical films of the optical unit.

10. A display device, comprising the backlight module as described in claim 7, and a display panel arranged on the backlight module, wherein, each of the outer frames further includes a top wall and at least one limiting member, the top wall is located above the surrounding portion of the inner frame, and the limiting member is disposed on the top wall and surrounds the periphery of the display panel.

11. A backlight module, comprising:

a light source, including a board and a plurality of light-emitting elements arranged in a matrix on the board;

a reflective unit, including a plurality of reflective portions arranged in a matrix, a surrounding portion surrounding the reflective portions, and at least one first joint member provided on the surrounding portion, the at least one first joint member extends along at least a first direction on the outer surface of the surrounding portion, wherein, each of the reflective portions has an opening, and the reflective unit is arranged on the board so that the light-emitting elements pass through the corresponding openings and extend into the corresponding reflecting portions; and a plurality of outer frames, which surround the reflective unit and are detachably coupled to the reflective unit along the first direction, each of the outer frames has at least one second joint member disposed on its inner surface, and the at least one second joint member of each said outer frame cooperates with the at least one first joint member of the reflective unit in the first direction to combine the outer frame with the reflective unit.

12. The backlight module as claimed in claim 11, wherein the backlight module further includes an optical unit, the optical unit has a plurality of optical films, and the surrounding portion of the reflective unit has a plurality of stepped platforms of different heights for adhering and fixing each of the optical films of the optical unit.

13. The backlight module as claimed in claim 11, wherein the backlight module further includes an optical unit disposed on the reflective unit, the reflective unit further includes at least one positioning member disposed on the surrounding portion, and the positioning member surrounds the optical unit.

14. The backlight module as claimed in claim 11, wherein the reflective unit further includes a plurality of fixed columns extending toward each of the outer frames, and the extension direction of the fixed columns is not parallel to the first direction.

15. The backlight module as claimed in claim 14, wherein the reflection unit further includes a plurality of ribs respectively provided on the outer surface of the corresponding fixed columns and arranged at radial intervals, and the ribs extend along the axial direction of the fixed columns and press against the board.

16. The backlight module as claimed in claim 14, wherein the board of the light source has a plurality of openings, and the fixed columns of the reflective unit are respectively aligned with the openings of the board.

17. The backlight module as claimed in claim 16, wherein each said outer frame includes a bottom wall, the bottom wall has a plurality of perforations, the perforations are respectively corresponding to the fixed columns of the reflective unit, and each of the fixed columns of the reflective unit extends into the opening of the board and does not extend into the perforation of the bottom wall.

18. A display device, comprising the backlight module as described in claim 11, and a display panel arranged on the backlight module, wherein, each of the outer frames further includes a top wall and at least one limiting member, the top wall is located above the surrounding portion of the reflective unit, and the limiting member is disposed on the top wall and surrounds the periphery of the display panel.

* * * * *